Patented Feb. 17, 1948

2,436,115

UNITED STATES PATENT OFFICE 2,436,115

MONOAZO COMPOUNDS

James G. McNally, Oak Ridge, Tenn., and Joseph B. Dickey, Rochester, N. Y., assignors to Eastman Kodak Company, Rochester, N. Y., a corporation of New Jersey No Drawing. Application June 15, 1945, Serial No. 599,743

8 Claims. (Cl. 260—207)

This invention relates to new monoazo dye compounds and their application to the art of dyeing or coloring.

It is an object of our invention to provide new monoazo compounds useful as dyes for the coloration or organic derivatives of cellulose textile materials and especially cellulose acetate textile materials. A further object of our invention is to provide azo compounds useful for the coloration of nylon, silk and wool textile materials. Another object is to provide a satisfactory process for the preparation of the new monoazo dye compounds of our invention. A particular object is to provide cellulose acetate textile material colored with the new monoazo compounds of the invention.

Our new monoazo compounds by means of which the above objects are accomplished or made possible are represented by the following general formula:

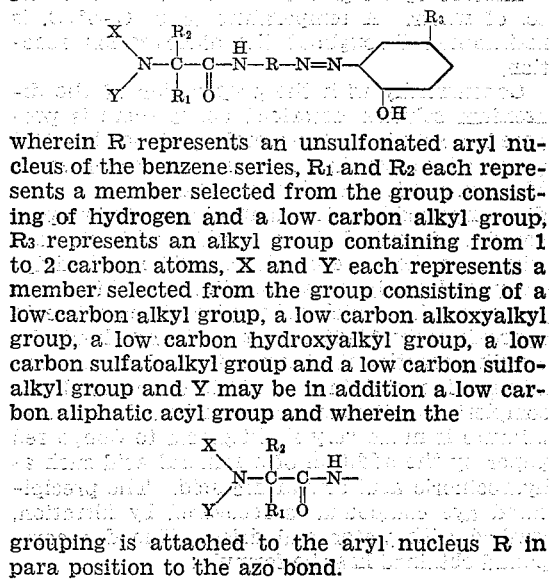

wherein R represents an unsulfonated aryl nucleus of the benzene series, $R_1$ and $R_2$ each represents a member selected from the group consisting of hydrogen and a low carbon alkyl group, $R_3$ represents an alkyl group containing from 1 to 2 carbon atoms, X and Y each represents a member selected from the group consisting of a low carbon alkyl group, a low carbon alkoxyalkyl group, a low carbon hydroxyalkyl group, a low carbon sulfatoalkyl group and a low carbon sulfoalkyl group and Y may be in addition a low carbon aliphatic acyl group and wherein the

grouping is attached to the aryl nucleus R in para position to the azo bond.

The monoazo compounds of the invention can be prepared by coupling the diazonium derivatives of the amines having the general formula

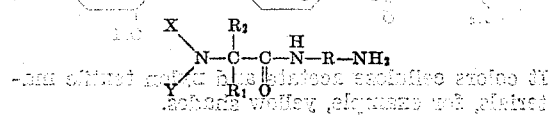

wherein R, $R_1$, $R_2$, X and Y have the meaning previously assigned to them and wherein the $$\begin{matrix} X & R_2 & & & H \\ & \diagdown & | & & | \\ & N-C-O-N- \\ & \diagup & | & \| \\ Y & R_1 & O \end{matrix}$$

grouping is attached to the unsulfonated aryl nucleus R in p-position to the amino group with p-cresol or p-ethylphenol.

The new monoazo compounds are for the most part yellow or yellowish-brown solids. They are soluble in the usual organic solvents such as ethanol, acetone and pyridine. With few exceptions they are substantially insoluble in cold water and but slightly soluble in hot water. They dissolve in warm caustic alkali solution.

The new monoazo dye compounds of our invention appear to be of greatest importance for the coloration of cellulose acetate textile materials, although they are useful for the coloration of nylon, wool and silk textile materials as well as organic derivatives of cellulose textile materials in general. Also cellulose ester and cellulose ether lacquers as well as lacquers from vinyl derivatives can be colored. The coloration yielded by the dyes is yellow.

Typical organic derivatives of cellulose that can be colored include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate propionate, cellulose acetate butyrate and the cellulose ethers such as methyl cellulose, ethyl cellulose or benzyl cellulose.

The dyeings yielded on cellulose acetate textile materials by the monoazo compounds of our invention are of good to excellent fasteness to light and washing. Further, these monoazo dye compounds possess good tinctorial power for cellulose acetate textile materials and dye such materials evenly and rapidly. It is also to be noted that among the properties that are particularly desired in a dye is freedom from sublimation. We have found that these new monoazo dye compounds have little or no tendency to sublime.

The following examples illustrate the new monoazo dye compounds and the manner of their preparation.

Example 1

19.3 grams of p-amino-α-dimethylamino-acetanilide are suspended in a mixture of 45 cc. of water, 100 grams of ice and 25 cc. of 36% hydrochloric acid. The resulting reaction mixture is then diazotized by adding with stirring a mixture of 7.4 grams of sodium nitrite in 20 cc. of water. A temperature of 0° C.–5° C. is maintained during the diazotization reaction.

Concurrently with the preparation of the diazonium solution described above there is prepared a solution of p-cresol by dissolving 10.8 grams of p-cresol in a mixture of 75 cc. of water, 100 grams of ice and 15 grams of 40% aqueous sodium hydroxide. The diazonium solution prepared as described above is added with vigorous stirring to the p-cresol solution. The desired dye compound precipitates immediately and the coupling reaction which takes place is complete in approximately 15–30 minutes. Throughout the coupling reaction the temperature of the reaction mixture is maintained at 10° C. or lower. Upon completion of the coupling reaction, the reaction mixture is made very slightly acid to Congo red paper by the addition of a mineral acid such as hydrochloric acid or sulfuric acid. The precipitated dye compound is recovered by filtration, washed with water and dried. The dye compound obtained has the formula:

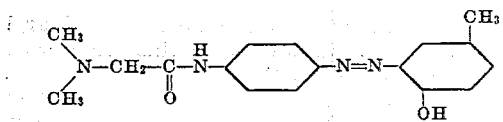

It colors cellulose acetate and nylon, for example, yellow shades.

Example 2

25.3 grams of p-amino-α-[di-(β-hydroxyethyl)-amino]-acetanilide are suspended in a mixture of 45 cc. of water, 100 grams of ice and 25 cc. of 36% hydrochloric acid. The resulting reaction mixture is then diazotized by adding with stirring a mixture of 7.4 grams of sodium nitrite in 20 cc. of water. A temperature of 0° C.–5° C. is maintained during the diazotization reaction.

Concurrently with the preparation of the diazonium solution described above there is prepared a solution of p-cresol by dissolving 10.8 grams of p-cresol in a mixture of 75 cc. of water, 100 grams of ice and 15 grams of 40% aqueous sodium hydroxide. The diazonium solution prepared as described above is added with vigorous stirring to the p-cresol solution. The desired dye compound precipitates immediately and the coupling reaction which takes place is complete in approximately 15–30 minutes. Throughout the coupling reaction the temperature of the reaction mixture is maintained at 10° C. or lower. Upon completion of the coupling reaction, the reaction mixture is made very slightly acid to Congo red paper by the addition of a mineral acid such as hydrochloric acid or sulfuric acid. The precipitated dye compound is recovered by filtration, washed with water and dried. The dye compound obtained has the formula:

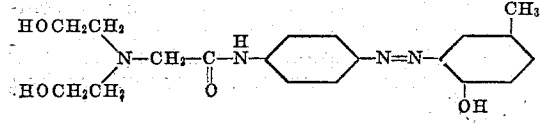

It colors cellulose acetate and nylon textile materials yellow shades.

Example 3

By the substitution of 26.7 parts of p-amino-α-[(ethyl-β,γ-dihydroxypropyl) - amino] - acetanilide for the corresponding amine compounds of Examples 1 and 2 and proceeding in accordance with the examples, the dye having the formula

is obtained. This dye compound colors cellulose acetate textile materials and nylon textile materials, for example, yellow from an aqueous suspension of the dye.

Example 4

By the substitution of 12.2 grams of p-ethylphenol for p-cresol in Example 1, the dye having the formula

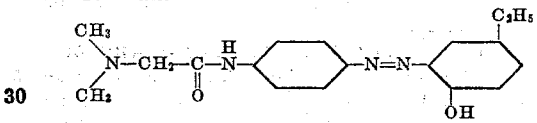

is obtained. This dye compound, as previously indicated, likewise colors cellulose acetate textile materials and nylon textile materials, for example, yellow shades from an aqueous suspension of the dye.

Example 5

20.7 grams of p-amino-α-methyl-α-dimethylamino-acetanilide are suspended in a mixture of 45 cc. of water, 100 grams of ice and 25 cc. of 36% hydrochloric acid. The resulting reaction mixture is then diazotized by adding with stirring a mixture of 7.4 grams of sodium nitrite in 20 cc. of water. A temperature of 0° C.–5° C. is maintained throughout the diazotization reaction.

Concurrently with the preparation of the diazonium solution described above there is prepared a solution of p-cresol by dissolving 10.8 grams of p-cresol in a mixture of 75 cc. of water, 100 grams of ice and 15 grams of 40% aqueous sodium hydroxide. The diazonium solution prepared as described above is added with vigorous stirring to the p-cresol solution. The desired dye compound precipitates immediately and the coupling reaction which takes place is complete in approximately 15–30 minutes. Throughout the coupling reaction the temperature of the reaction mixture is maintained at 10° C. or lower. Upon completion of the coupling reaction, the reaction mixture is made very slightly acid to Congo red paper by the addition of a mineral acid such as hydrochloric acid or sulfuric acid. The precipitated dye compound is recovered by filtration, washed with water and dried. The dye compound obtained has the formula:

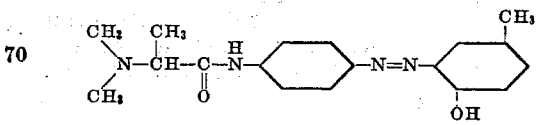

It colors cellulose acetate and nylon textile materials, for example, yellow shades.

Following the procedure described in the foregoing examples, the monoazo dye compounds tabulated hereinafter can be prepared.

6.
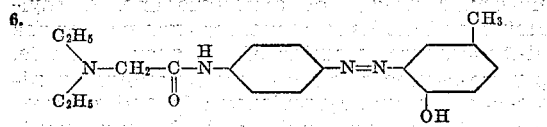

7.
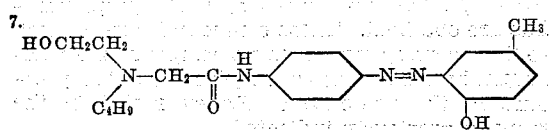

8.
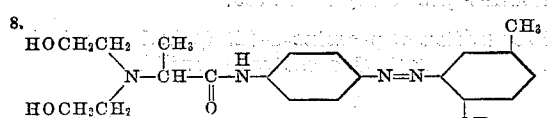

9.
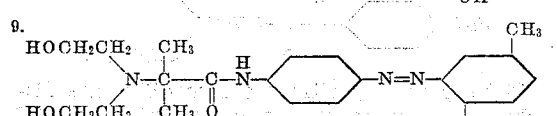

10.
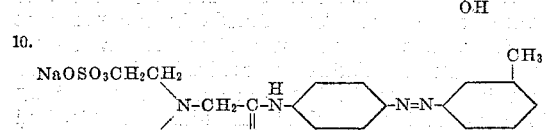

11.
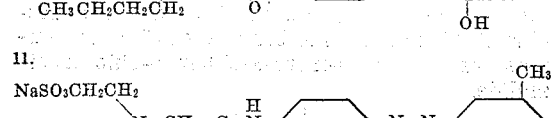

12.

13.
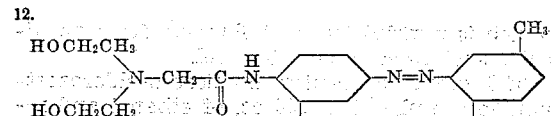

14.
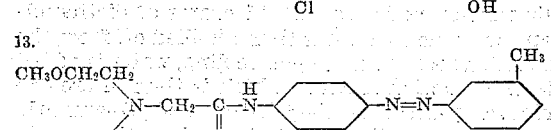

15.
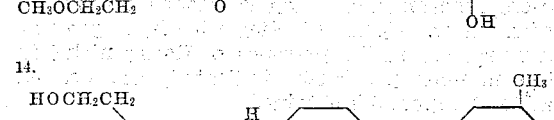

16.
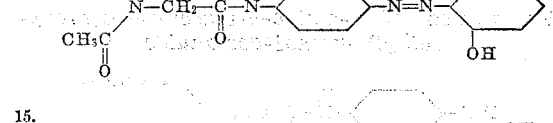

17.
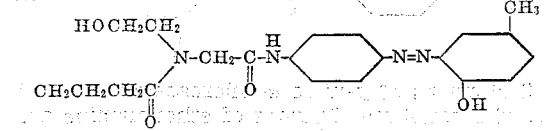

18.
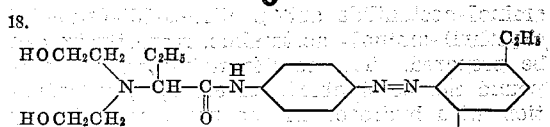

19.
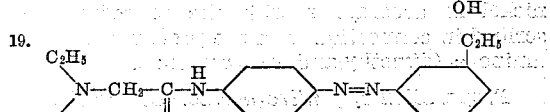

20.
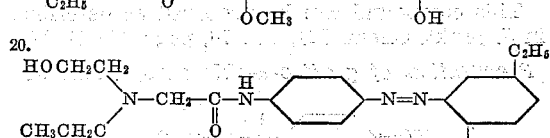

It will be understood that the foregoing compounds are intended to be illustrative and not limitative of our invention as obviously a considerable number of other compounds included within the scope of our invention can be prepared. To illustrate, p-ethylphenol can be used in place of p-cresol in the dye compounds numbered 6–15 inclusive, to obtain additional monoazo compounds of our invention. Further the unsulphonated aryl nucleus designated R can be substituted with substituents such as Cl, Br, methyl, methoxyl and ethoxyl. Normally the simpler compounds would be prepared since their preparation involves less cost.

In order that the preparation of the azo compounds of our invention may be entirely clear, the preparation of various intermediate compounds used in their manufacture is indicated hereinafter.

*Preparation of p-amino-ω-dimethylamino-acetanilide*

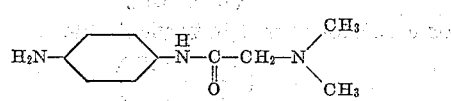

20 grams of p-nitro-ω-dimethylamino-acetanilide are placed in a shaking autoclave together with 0.05 gram of Raney nickel and 100 cc. of methanol and the resulting mixture is reacted at 75° C.–100° C. with hydrogen under a pressure of 100 atmospheres. Upon completion of the reduction reaction, approximately 15–30 minutes, the bomb containing the reaction mixture is cooled, the reaction mixture removed and filtered to remove the Raney nickel. On concentration of the reaction mixture p-amino-ω-dimethylamino-acetanilide is obtained as brownish-white crystals melting at 161°–165° C.

*Preparation of p-nitro-ω-dimethylamino-acetanilide*

21.5 grams of p-nitro-ω-chloroacetanilide are dissolved in 100 cc. of ethanol and 9 grams of dimethylamine are added. The reaction mixture is refluxed for 5 hours and then poured into water and filtered. Upon purifying the solid recovered in the filtration operation by crystallization from ethyl alcohol p-nitro-ω-dimethylamino-acetanilide melting at 200° C.–205° C. is obtained.

By substituting an equivalent molecular weight of diethylamine, diethanolamine, methyl-ethylamine or di-(β-methoxyethyl)-amine, for example, for dimethylamine in the foregoing reaction p-nitro-ω-diethylamino-acetanilide, p-nitro-ω-di-(β-hydroxyethyl)-amino-acetanilide (M. P. 207–211° C.) p-nitro-ω-[(methyl-ethyl-)

amino]-acetanilide and p-nitro-ω-[di-(β-methoxyethyl)-amino]-acetanilide, respectively, can be prepared. The corresponding amino compound can be obtained, for example, by reduction with hydrogen in the presence of Raney nickel in accordance with the procedure described in connection with the preparation of p-amino-ω-(dimethylamino)acetanilide.

*Preparation of p-nitro-ω-chloroacetanilide*

This compound can be prepared as described in J. prakt. Chem. [2], vol. 76, page 360 (1907).

*Preparation of p-nitro-α-chloropropionanilide*

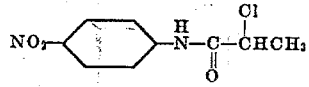

13.8 grams of p-nitroaniline are dissolved in dry benzene and reacted with 12.7 grams of α-chloropropionylchloride

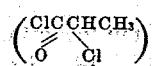

in the presence of 5.3 grams of sodium carbonate. When no more carbon dioxide is evolved, the sodium chloride formed in the reaction is removed by filtration following which the benzene is distilled off in any suitable manner from the filtrate. The residue remaining from the benzene distillation consists of crude p-nitro-α-chloro-propionanilide. It is purified by crystallization from an alcohol such as ethanol or butanol.

By substituting an equivalent gram molecular weight of α-chloro-isobutyrylchloride

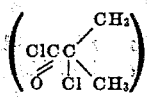

or α-chloro-normal-butyrylchloride

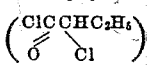

for the α-chloro-propionylchloride of the example

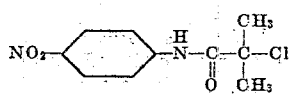

and

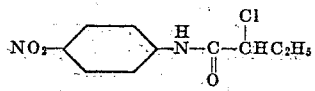

respectively, are obtained.

*Preparation of p-nitro-α-di-(β-methoxyethyl)-amino propionanilide*

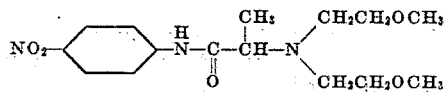

22.9 grams of p-nitro-α-chloropropionanilide are dissolved in 100 cc. of ethanol and refluxed for five hours with 26.6 grams of di-β-methoxyethylamine and 5.3 grams of sodium carbonate. Upon cooling the reaction mixture is poured into 500 cc. of cold water and the desired compound is recovered by filtration and washed free of sodium chloride with water. The nitro compound obtained is then reduced to the corresponding p-amino-α-[di-(β-methoxy-ethyl)-amino]-propionanilide by treatment with hydrogen under pressure in the presence of Raney nickel as described in connection with the preparation of p-amino-ω-dimethylamino-acetanilide.

By the substitution of an equivalent gram molecular weight of dimethylamine, diethylamine, and diethanolamine, for example, for the di-β-methoxyethylamine of the above example, p-nitro-α-dimethylamino-propionanilide, p-nitro-α-diethylamino-propionanilide and p-nitro-α-[di-(β-hydroxyethyl)-amino]-propionanilide are obtained. These compounds are reduced to their corresponding amino compounds, for example, by treatment with hydrogen under pressure in the presence of Raney nickel in the manner previously indicated.

*Preparation of p-amino-α-[di-(β-hydroxyethyl)-amino]-o-chloroacetanilide*

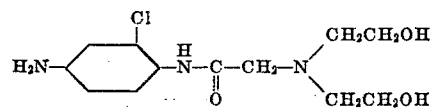

17.2 grams of p-nitro-o-chloroaniline are dissolved in dry benzene and reacted with 11.3 grams of chloroacetyl chloride in the presence of 5.3 grams of sodium carbonate. When no more carbon dioxide is evolved, the sodium chloride formed in the reaction is removed by filtration following which the filtrate is distilled over a steam bath to remove benzene. The residue obtained from the benzene distillation consists of crude p-nitro-α-chloro-o-chloroacetanilide.

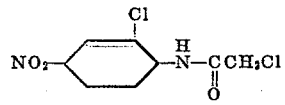

which is purified by crystallization from an alcohol such as ethanol or butanol.

24.9 grams of p-nitro-α-chloro-o-chloroacetanilide are placed in 150 cc. of ethanol and refluxed for six hours with 21 grams of diethanolamine. The ethanol is then distilled off from the reaction mixture and upon cooling, water is added to the reaction mixture which is then filtered to recover p-nitro-α-[di-(β-hydroxyethyl)-amino]-o-chloroacetanilide which is washed thoroughly with water. Upon reduction with hydrogen under pressure in the presence of Raney nickel in the manner previously indicated, the desired amino compound is obtained.

*Preparation of p-amino-α-[(acetyl-β-hydroxyethyl)-amino]-acetanilide*

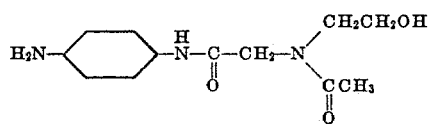

21.0 grams of p-nitro-α-chloroacetanilide, 150 cc. of ethanol and 7 grams of ethanolamine are placed in a flask equipped with a reflux condenser and refluxed together for 6 hours. The ethanol is then distilled off from the reaction mixture and upon cooling, water is added to the reaction mixture which is then filtered to recover p-nitro-α-[(mono-β-hydroxyethyl)-amino]-acetanilide which is washed thoroughly with water and then suspended in 200 cc. of water and 10.2 cc. of acetic anhydride with vigorous stirring. The p-nitro-α-[(acetyl-β-hydroxyethyl)-amino]-acetanilide formed is recovered by filtration, washed well with water and dried. It is then converted to p-amino-α-[(acetyl-β-hydroxyethyl)-amino]-acetanilide by treatment with hydrogen under pressure in the presence of Raney nickel.

By the substitution of an equivalent molecular weight of propionic anhydride or butyric anhydride for acetic anhydride in the foregoing example the corresponding propionyl and butyryl derivatives are obtained.

*Preparation of p-amino-α-[(n-butyl-β-sulfatoethyl)-amino]-acetanilide*

29.6 grams of p-nitro-α-[(n-butyl-β-hydroxyethyl)-amino]-acetanilide are dissolved in 500 cc. of dry carbon tetrachloride and cooled to 0° C. Then 14 grams of freshly distilled chlorosulfonic acid are added slowly with stirring over a period of 30 minutes, the temperature being permitted to slowly rise to 30° C. The carbon tetrachloride and the hydrogen chloride formed during the reaction are then removed by distillation under reduced pressure, following which 200 cc. of water are added to the reaction mixture. The reaction mixture is then made neutral by the addition of sodium bicarbonate. The nitro compound is reduced in solution with hydrogen under pressure in the presence of Raney nickel to obtain p-amino-α-[(n-butyl-β-sulfatoethyl)-amino]-acetanilide.

*Preparation of p-amino-α-[(ethyl-β,γ-dihydroxypropyl)-amino]-acetanilide*

This compound can be prepared by reacting p-nitro-α-chloroacetanilide with ethylamine to obtain p-nitro-α-(mono-ethylamino)-acetanilide which is in turn reacted with glycerol chlorohydrin ($ClCH_2CHOHCH_2OH$) to yield p-nitro-α-[(ethyl-β,γ-dihydroxypropyl)-amino]-acetanilide, which upon reduction with hydrogen under pressure in the presence of Raney nickel gives p-amino-α-[(ethyl-β,γ-dihydroxypropyl)-amino]-acetanilide.

While the manner of preparation of all the amine compounds used in the preparation of the azo compounds of our invention have not been specifically described, from the foregoing examples their preparation will be apparent to those skilled in the art to which our invention is directed.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in our U. S. Patent No. 2,115,030, issued April 26, 1938. The process disclosed in this patent for the dyeing of cellulose acetate can be used in applying dyes of the present application to this material. While a satisfactory method of dyeing has been disclosed herein, it will be understood that any other suitable methods for dyeing the textile materials named herein can be employed. Lacquers may be colored with the dye compounds of our invention by the methods customarily employed in the lacquer art.

It is here noted that the term "nylon" refers to a linear polyamide resin which is believed to basically be described or claimed in U. S. Letters Patent 2,071,250, issued February 16, 1937, to Wallace H. Carothers.

We claim:

1. The azo compounds having the general formula:

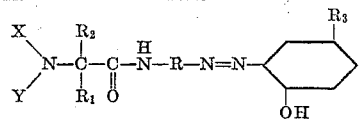

wherein R represents an unsulfonated aryl nucleus of the benzene series, $R_1$ and $R_2$ each represents a member selected from the group consisting of hydrogen and a low carbon alkyl group, $R_3$ represents an alkyl group containing from 1 to 2 carbon atoms, X and Y each represents a member selected from the group consisting of a low carbon alkyl group, a low carbon alkoxyalkyl group, a low carbon hydroxyalkyl group, a low carbon sulfatoalkyl group and a low carbon sulfoalkyl group and Y may be in addition a low carbon aliphatic acyl group and wherein the

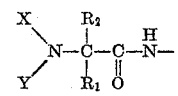

grouping is attached to the aryl nucleus R in para position to the azo bond.

2. The azo compounds having the general formula:

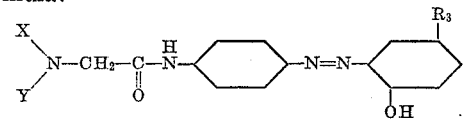

wherein $R_3$ represents an alkyl group containing from 1 to 2 carbon atoms and X and Y each represents a member selected from the group consisting of a low carbon alkyl group, a low carbon alkoxyalkyl group, a low carbon hydroxyalkyl group, a low carbon sulfatoalkyl group and a low carbon sulfoalkyl group and Y may be in addition a low carbon aliphatic acyl group.

3. The azo compounds having the general formula:

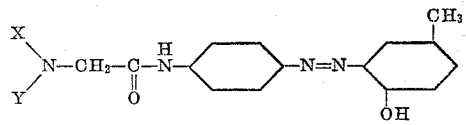

wherein X and Y each represents a low carbon alkyl group.

4. The azo compounds having the general formula:

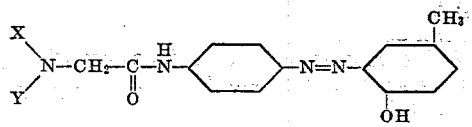

wherein X and Y each represents a low carbon hydroxyalkyl group.

5. The azo compounds having the general formula:

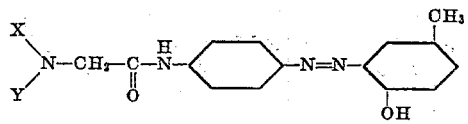

wherein X represents a low carbon alkyl group and Y represents a low carbon hydroxyalkyl group.

6. The azo compound having the formula:

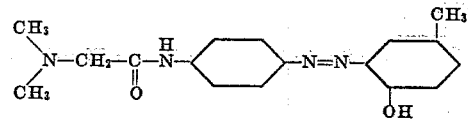

7. The azo compound having the formula:

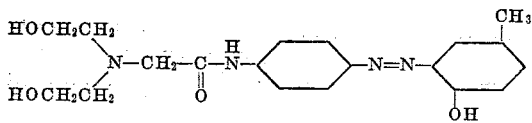

8. The azo compound having the formula:

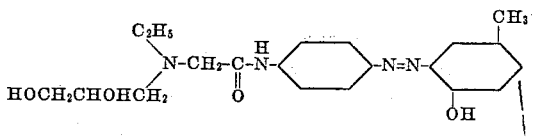

JAMES G. McNALLY.
JOSEPH B. DICKEY.

REFERENCES CITED

The following references are of record in the file of this patent:

UNITED STATES PATENTS

| Number | Name | Date |
|---|---|---|
| 1,706,484 | Fischer | Mar. 26, 1929 |
| 2,359,862 | Linch | Oct. 10, 1944 |
| 2,346,013 | Dickey | Apr. 4, 1944 |
| 2,382,433 | McNally | Aug. 14, 1945 |